Sept. 28, 1926.
J. T. PEARSON ET AL
1,601,084
COVER FOR ELECTRIC OUTLET BOXES
Original Filed Sept. 27, 1922
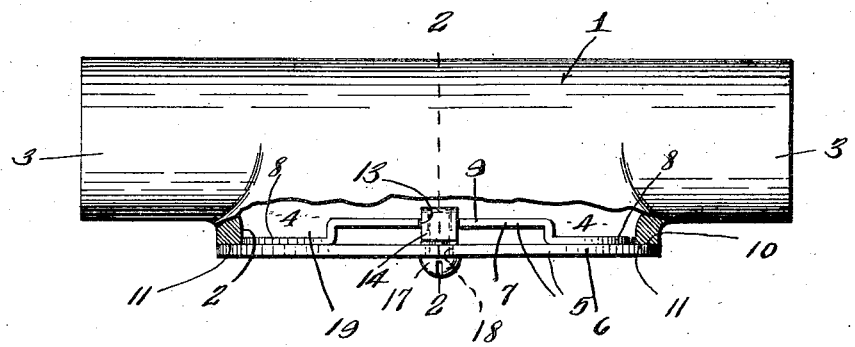
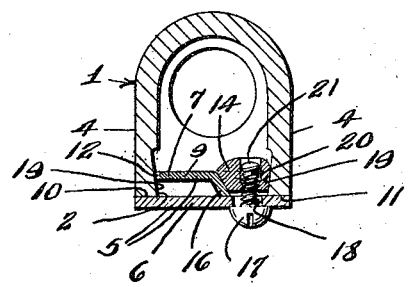
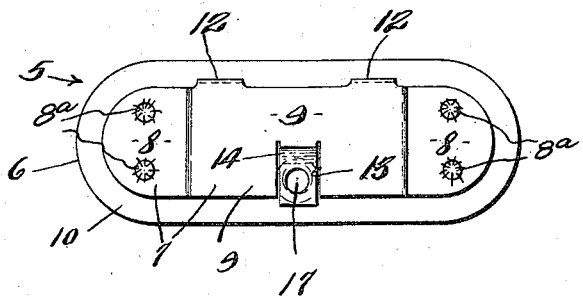
INVENTORS
John T. Pearson and Raymond H. Olley
BY Parsons & Bodell
ATTORNEYS.

Patented Sept. 28, 1926.

1,601,084

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

COVER FOR ELECTRIC OUTLET BOXES.

Application filed September 27, 1922, Serial No. 590,763. Renewed December 10, 1924.

This invention relates to electric outlet boxes and has for its object a cover or closure for the open side of the box, which is particularly simple and economical in construction and readily attachable by self-contained means to the open side of the box. This cover and box are of the general type of that described in our Patent No. 1,525,689, issued February 10, 1925.

The invention consists in the novel features and in the combinations and constructions hereinafter set forth and claimed.

In describing this invention, reference is had to the accompanying drawings, in which like characters designate corresponding parts in all the views.

Figure 1 is an elevation, partly in section, of the conduit outlet box provided with our cover.

Figure 2 is a sectional view on line 2—2, Fig. 1.

Figure 3 is an inner face view of the cover.

1 designates the box which may be of any suitable form, size and construction, it being here shown as provided with an elongated opening 2 in one side thereof and with one or more nipples 3 for connection to electric conduits enclosing the surface wires. The opening 2 is elongated and bounded by opposing substantially parallel walls 4 and has rounding end walls.

5 is a cover for the opening 2, the cover comprising a body, as a plate 6, and a plate 7 on the inner face of the plate 6 and having its end portions 8 secured to the inner face of the plate 6 in any suitable manner and having its intermediate portion 9 offset or spaced apart from the inner face of the plate 6. The end portions 8 of the plate 7 are usually secured to the plate 6 by spot welding, indicated at 8ª.

The plate 7 is generally the same form but of less length than width than the body 6 and is so placed thereon as to leave a marginal bearing face 10 around the inner face of the body 6, which face rests upon the edge 11 of the box around the opening 2 or on the gasket interposed between such face 10 and said edge.

When the plate is mounted on the box, the edges of the end portions 8 engage the rounding ends of the opening 2 and thus facilitate the centering or locating of the cover on the box and the intermediate portion 9 on the plate 7 projects into the box with its edges opposed to the inner faces of the side walls 4 of the box.

One edge of such intermediate portion 9 is arranged to engage the opposing inner face of one side wall 4 and as here shown, such edge is provided with spaced apart projections, or shoulders 12 for engaging the inner face of such wall 4 at spaced apart points; and the intermediate portion 9 is formed in its opposite margin with a slot 13, the open end of which is held toward the inner face on the opposite wall 4 of the box to that engaged by the shoulders 12.

The cover is held in position by means coacting with the intermediate portion 9 of the plate and operable from the outer side of the body 6, this means is shown as a wedge member 14 arranged in the slot 13 and coacting with the end wall of the slot 13 so as to be thrust outwardly to engage the opposing inner face of the wall 4 of the box when the wedge member is drawn toward the inner face of the body 6.

In the illustrated embodiment of our invention the intermediate member 9 is formed with an inclined tongue 16 at the inner end of the slot 13 and the wedge is formed with an inclined face engaging the inclined tongue 16.

The wedge member is operated by means of a screw 17 extending through a hole 18 in the plate 6 and threading into the wedge, thus when the screw is tightened, the wedge is drawn toward the body 6 and during this operation, is thrust outwardly to snugly engage the opposing inner face of the side walls 4 and thrust the cover laterally to cause the shoulders 12 to snugly engage the inner face of the opposing side wall 4. Preferably, the inner faces of the walls 4 are bevelled as at 19 and the wedge is also bevelled at its outer face so that when the wedge is tightened, the cover is attached to the box by practically a dove-tailed joint.

The opening 18 in the body 6, is a slot, in order to permit the screw to shift with the wedge as it moves outwardly or inwardly during the tightening or loosening of the screw.

Also the outer end of the passage in the wedge member in which the screw threads, is counterbored, or enlarged at 20 and the end of the screw enlarged at 21 to prevent the complete withdrawal of the screw from the wedge member.

By the term "closure" is meant, not only a cover, but a cover and plate, or any appliance or fixture mountable upon a conduit outlet box closing the opening therein.

What we claim is:

1. A cover for electric outlet boxes having an opening in one side, the cover comprising a body and a plate on the inner face of the body having its ends secured to the inner face of the body and its intermediate part spaced from such inner face and means for attaching the cover to the box including a member coacting with such intermediate portion and with the opposing face of the side wall of the box around the opening and an operating member for said member extending through the body to the top side thereof, substantially as and for the purpose described.

2. A cover for electric outlet boxes having an opening in one side, the cover comprising a body and a plate on the inner face of the body having its ends secured to the inner face of the body and its intermediate part spaced apart from such inner face, one edge of the intermediate portion being arranged to engage the inner face of one side wall of the box around the opening, a wedge member arranged to engage the inner face on the opposite wall of the box, the wedge member thrusting against said intermediate portion and an operating member for the wedge member extending through the body to the outer side thereof, substantially as and for the purpose specified.

3. A cover for electric outlet boxes having an opening in one side, the cover comprising a body and a plate on the inner face of the body and having its ends secured to the inner face of the body and its intermediate portion spaced apart from such inner face, one edge of the intermediate portion being formed with spaced apart shoulders arranged to engage at spaced apart points the inner face of one side wall of the box around the opening and a wedge member arranged to engage the inner face on the opposite side wall of the box, the wedge member thrusting against said intermediate portion on a line between said shoulders and an operating member for the wedge member extending through the body and operable from the outer side thereof, substantially as and for the purpose set forth.

4. A cover for electric outlet boxes having an opening on one side, the cover comprising a body and a plate on the inner face of the body having its ends secured to the inner face of the body and its intermediate portion spaced apart from such inner face, one edge of the intermediate portion being arranged to engage the inner face of one side wall of the box around the opening and the intermediate part being formed with a slot opening through its opposite edge, the open end of the slot being opposed to the inner face on the opposite side wall of the box, a wedge member arranged in said slot and coacting with the inner end wall of the slot, and means for moving the wedge member toward the inner face of the body and thereby causing it to wedge outwardly into engagement with the opposing inner face of the side wall of the box, said means being operable from the outer face of the body, substantially as and for the purpose described.

5. A cover for electric outlet boxes having an opening in one side, the cover comprising a body and a plate on the inner face of the body having its ends secured to the inner face of the body and its intermediate part spaced apart from such inner face, one edge of the intermediate portion being arranged to engage the inner face of one side wall of the box around the opening and such intermediate part being formed with a slot opening through its opposite edge and with an inclined tongue forming the inner end wall of the slot, and a wedge member arranged in the slot and coacting with said inclined tongue and projecting beyond the edge of the intermediate part, a screw extending through the body from the top side thereof and threading into the wedge member, whereby upon tightening of the screw the wedge member moves along the inclined tongue and is thrust outwardly to engage the inner face of the opposing side wall of the box, substantially as and for the purpose specified.

6. A cover for electric outlet boxes having an opening in one side, the cover comprising a body and a plate on the inner face of the body having its ends secured to the inner face of the body and its intermediate part spaced apart from such inner face, one edge of the intermediate portion being formed with spaced apart shoulders arranged to engage at spaced apart points, the inner face of one side wall of the box around the opening and such intermediate portion being provided with a slot opening through its opposite edge on the line between said shoulders, the open end of the slot being opposed to the inner face of the opposite side wall of the body, a wedge member arranged in the slot and coacting with the end wall of the slot to be thrust outwardly thereby and a screw extending through the cover and threading into the wedge member, substantially as and for the purpose set forth.

7. A cover for electric outlet boxes having an elongated opening in one side, the cover comprising an elongated body having its margin arranged to rest on the edge around the opening and a plate on the inner face of the body having its ends secured to the inner face of the body and its intermediate portion spaced apart from the inner face, the plate being of less length than width than the body, whereby its projecting portion extends into the box, one edge of the intermediate portion being arranged to engage the inner face of one side wall of the box around the opening and such intermediate portion being formed with a slot at its opposite edge, the open end of the slot being opposed to the inner face on the opposite side wall of the body, a wedge member arranged in the slot and coacting with the end wall of the slot to be thrust outwardly when the wedge member is moved toward the inner face of the body and a screw extending through the body and threading into the wedge member, substantially as and for the purpose described.

8. In combination with an electric outlet box having an opening in one side, a cover, a plate on the inner face of the cover having its ends secured to the inner face of the cover and its intermediate part spaced from such inner face, the plate being of substantially the same outline, and nearly coextensive with the opening of the box into which it extends, means for attaching the cover to the box coacting with such intermediate portion of the plate and with the opposite face of the side wall of the box around the opening, and means for operating said attaching member extending through the cover to the top side thereof.

9. In combination with an electric outlet box having an opening in one side, a cover, a plate on the inner face of the cover having its ends secured to the inner face thereof and its intermediate part spaced apart from such inner face, one edge of the intermediate portion being arranged to engage the inner face of one side wall of the box around the opening, a wedge member arranged to engage the inner face on the opposite wall of the box, the wedge member thrusting against said intermediate portion, and an operating member for the wedge member extending through the cover to the outer side thereof.

10. The combination with an electric outlet box having an opening in one side, a cover, a plate on the inner face of the cover and having its ends secured to the inner face thereof and its intermediate portion spaced apart from such inner face, one edge of the intermediate portion being formed with a spaced apart shoulder arranged to engage at spaced apart points the inner face of one side wall of the box around the opening, a wedge member arranged to engage the inner face on the opposite side wall of the box, the wedge member thrusting against said intermediate portion on a line between said shoulders, and an operating member for the wedge member extending through the cover and operable from the outer side thereof.

11. The combination with an electric outlet box having an opening on one side, a cover, a plate on the inner face of the cover having its ends secured to the inner face thereof and its intermediate portion spaced apart from such inner face, one edge of the intermediate portion being arranged to engage the inner face of one side wall of the box around the opening and the intermediate part being formed with a slot opening through its opposite edge, the open end of the slot being opposed to the inner face on the opposite side wall of the box, a wedge member arranged in said slot and coacting with the inner end wall of the slot, and means for moving the wedge member toward the inner face of the cover and thereby causing it to wedge outwardly into engagement with the opposing face of the side wall of the box, said means being operable from the outer face of the cover.

12. The combination with an electric outlet box having an opening in one side, a cover, a plate on the inner face of the cover having its ends secured to the inner face thereof, and its intermediate part spaced apart from such inner face, one edge of the intermediate portion being arranged to engage the inner face of one side wall of the box around the opening and such intermediate part being formed with a slot opening through its opposite edge and with an inclined tongue forming the inner end wall of the slot, a wedge member arranged in the slot and coacting with said inclined tongue and projecting beyond the edge of the intermediate part, a screw extending through the cover from the top side thereof and threading into the wedge member, whereby upon tightening of the screw the wedge member moves along the inclined tongue and is thrust outwardly to engage the inner face of the opposing side wall of the box.

13. The combination with an electric outlet box having an opening in one side, a cover, a plate on the inner face of the cover having its ends secured to the inner face thereof and its intermediate part spaced apart from such inner face, one edge of the intermediate portion being formed with spaced apart shoulders arranged to engage at spaced apart points, the inner face of one side wall of the box around the opening and such intermediate portion being provided with a slot opening through its opposite edge on the line between said shoulders, the open end of the slot being opposed to the inner face of the opposite side wall of the cover, a wedge member arranged in the slot and coacting with the end wall of the slot to be thrust outwardly thereby, and a screw extending through the cover and threading into the wedge member.

14. The combination with an electric outlet box having an elongated opening in one side, a cover comprising an elongated body having its margin arranged to rest on the edge around the opening, a plate on the inner face of the cover having its ends secured to the inner face thereof and its intermediate portion spaced apart from the inner face, the plate being of less length and width than the body whereby its projecting portion extends into the box, one edge of the intermediate portion being arranged to engage the inner face on one side wall of the box around the opening and such intermediate portion being formed with a slot at its opposite edge, the open end of the slot being opposed to the inner face of the opposite side wall of the cover, a wedge member arranged in the slot and coacting with the end wall of the slot to be thrust outwardly when the wedge member is moved toward the inner face of the cover and a screw extending through the cover and threading into the wedge member.

In testimony whereof, we have hereunto signed our names, at Syracuse, in the county of Onondaga, and State of New York, this 18th day of September, 1922.

JOHN T. PEARSON.
RAYMOND H. OLLEY.